(12) United States Patent
Kannampalli

(10) Patent No.: US 11,921,598 B2
(45) Date of Patent: Mar. 5, 2024

(54) PREDICTING WHICH TESTS WILL PRODUCE FAILING RESULTS FOR A SET OF DEVICES UNDER TEST BASED ON PATTERNS OF AN INITIAL SET OF DEVICES UNDER TEST

(71) Applicant: Teradyne, Inc., North Reading, MA (US)

(72) Inventor: Padmanabha Kannampalli, North Reading, MA (US)

(73) Assignee: Teradyne, Inc., North Reading, MA (US)

( * ) Notice: Subject to any disclaimer, the term of this patent is extended or adjusted under 35 U.S.C. 154(b) by 0 days.

(21) Appl. No.: 17/500,294

(22) Filed: Oct. 13, 2021

(65) Prior Publication Data
US 2023/0111796 A1 Apr. 13, 2023

(51) Int. Cl.
*G06F 11/26* (2006.01)
*G06F 11/22* (2006.01)
*G06N 20/00* (2019.01)
*G06F 11/263* (2006.01)

(52) U.S. Cl.
CPC ...... *G06F 11/2263* (2013.01); *G06F 11/2268* (2013.01); *G06F 11/26* (2013.01); *G06N 20/00* (2019.01); *G06F 11/2635* (2013.01)

(58) Field of Classification Search
CPC .. G06F 11/2263; G06F 11/2268; G06F 11/26; G06F 11/2635
See application file for complete search history.

(56) References Cited

U.S. PATENT DOCUMENTS 6,167,352 A * 12/2000 Kanevsky ...... G01R 31/318371
714/33
6,393,594 B1 * 5/2002 Anderson ...... G01R 31/318385
714/724
(Continued)

FOREIGN PATENT DOCUMENTS

| EP | 0 887 733 A2 * | 6/1998 |
| WO | 2021056101 A1 | 4/2021 |
| WO | 2021148116 A1 | 7/2021 |

OTHER PUBLICATIONS

Wikipedia's Neural Network historical version published Sep. 11, 2021 https://en.wikipedia.org/w/index.php?title=Neural_network &oldid=1043685595 (Year: 2021).*

(Continued)

*Primary Examiner* — Joseph O Schell
(74) *Attorney, Agent, or Firm* — Burns & Levinson LLP

(57) ABSTRACT

Example techniques may be implemented as a method, a system or more non-transitory machine-readable media storing instructions that are executable by one or more processing devices, Operations performed by the example techniques include obtaining data representing results of tests executed by one or more test instruments on an initial set of devices under test (DUTs) in a test system; and using the data to train a machine learning model. The machine learning model is for predicting which of the tests will produce failing results for a different set of DUTs. DUTs in the different set have one or more features in common with DUTs in the initial set.

23 Claims, 6 Drawing Sheets

(56) References Cited

U.S. PATENT DOCUMENTS

| | | | | |
|---|---|---|---|---|
| 6,510,398 | B1* | 1/2003 | Kundu | G01R 31/318544 702/120 |
| 10,929,260 | B2* | 2/2021 | Hsu | H04L 43/04 |
| 2004/0268200 | A1* | 12/2004 | Mak | G01R 31/31707 714/742 |
| 2006/0208169 | A1* | 9/2006 | Breed | G01S 17/88 250/221 |
| 2007/0226570 | A1* | 9/2007 | Zou | G01R 31/3177 714/741 |
| 2008/0115029 | A1* | 5/2008 | Kusko | G01R 31/318364 714/742 |
| 2009/0210763 | A1* | 8/2009 | Eckelman | G01R 31/318536 714/E11.002 |
| 2011/0178967 | A1* | 7/2011 | Delp | G06F 11/2263 706/20 |
| 2016/0321538 | A1* | 11/2016 | Geiger | G06N 3/08 |
| 2017/0294236 | A1* | 10/2017 | Kang | G11C 11/4093 |
| 2020/0075117 | A1* | 3/2020 | Lai | G11C 29/38 |
| 2020/0159606 | A1 | 5/2020 | Derat et al. | |
| 2020/0278901 | A1* | 9/2020 | Singh | G06N 5/02 |
| 2020/0293436 | A1* | 9/2020 | Carames | G06F 11/3419 |
| 2020/0333394 | A1 | 10/2020 | Cilingiroglu et al. | |
| 2021/0109845 | A1* | 4/2021 | Shah | G06F 9/547 |
| 2021/0110284 | A1* | 4/2021 | Rossetto | G06F 11/2257 |
| 2021/0223309 | A1 | 7/2021 | Salls et al. | |
| 2021/0279577 | A1* | 9/2021 | West | G06N 3/0445 |
| 2021/0286000 | A1 | 9/2021 | Lyons et al. | |
| 2022/0179777 | A1* | 6/2022 | Bhat | G06F 11/3688 |

OTHER PUBLICATIONS 8 time complexities that every programmer should know by Adrian Mejia published Sep. 19, 2019 https://adrianmejia.com/most-popular-algorithms-time-complexity-every-programmer-should-know-free-online-tutorial-course/ (Year: 2019).*

J. Colantonio, "5 great ways to use AI in your test automation," TechBeacon, https://techbeacon.com/app-dev-testing/how-ai-changing-test-automation-5-examples (8 pages).

International Search Report for International Patent Application No. PCT/US2022/046000, dated Feb. 2, 2023, (3 Pages).

Written Opinion for International Patent Application No. PCT/US2022/046000, dated Feb. 2, 2023, (5 Pages).

Stoyan Stoyanov et al., 'Predictive analytics methodology for smart qualification testing of electronic components', Journal of Intelligent Manufacturing, vol. 30, pp. 1497-1514, Jan. 18, 2019, pp. 1497-1503, 1509; and figures 1-3.

* cited by examiner

PREDICTING WHICH TESTS WILL PRODUCE FAILING RESULTS FOR A SET OF DEVICES UNDER TEST BASED ON PATTERNS OF AN INITIAL SET OF DEVICES UNDER TEST

TECHNICAL FIELD

This specification relates generally to example processes for predicting tests that a device will fail.

BACKGROUND

Automatic test equipment (ATE) includes electronics for sending signals to, and receiving signals from, a device under test (DUT) in order to test the operation of the DUT. The ATE includes different types of test instruments configured perform different types of tests on the DUT The ATE records whether the DUT passed or failed such tests. For example, pass/fail data may be stored in computer memory.

SUMMARY

Example techniques may be implemented as a method, a system or more non-transitory machine-readable media storing instructions that are executable by one or more processing devices. Operations performed by the example techniques include obtaining data representing results of tests executed by one or more test instruments on an initial set of devices under test (DUTs) in a test system; and using the data to train a machine learning model. The machine learning model is for predicting which of the tests will produce failing results for a different set of DUTs. DUTs in the different set have one or more features in common with DUTs in the initial set. The techniques may include one or more of the following features, either alone or in combination.

The machine learning model may be configured to perform predicting for a first DUT in the different set by matching, at least partly, a first pattern associated with the first OUT with a second pattern associated with a second DUT in the initial set. The first pattern may correspond to first tests that the first OUT has passed or failed, and the second pattern may correspond to the first tests that the second OUT has passed or failed. Predicting which of the tests will produce a failing result for the first DUT may include identifying second tests that the second DUT has failed. The second tests may be predicted ones of the tests that the first DUT will fail. The first pattern may be a binary pattern representing passes or fans with ones or zeros, and the second pattern may be a binary pattern representing passes or fails with ones or zeros.

Example techniques may be implemented as a method, a system or more non-transitory machine-readable media storing instructions that are executable by one or more processing devices. Operations performed by the example techniques include using a machine learning model to predict which tests a first device under test (DUT) will fail, where prediction by the machine learning model is based on pattern matches associated with tests previously run on second DUTs. The operations may also include: after the first DUT has failed a first test among the tests, controlling a test system to continue testing the first DUT using tests that the first DUT has been predicted to fail by the machine learning model, and outputting test results for the first DUT based on the tests that the first DUT has been predicted to fail. The techniques may include one or more of the following features, either alone or in combination.

The operations may include analyzing the test results to identify a cause of test failure by the first DUT. Analyzing the test results may be performed absent a test insertion for the first DUT, where, during the test insertion, a probe contacts the first DUT while the first DUT is operating. The machine learning model may be configured make a prediction during a test insertion for the first DUT, where, during the test insertion, a probe contacts the DUT while the DUT is operating. The operations may include analyzing the test results to determine whether to retest the first DUT, Predicting may be performed in 10 milliseconds (ms) or less. The machine learning model may be executed on a separate computing system than a computing system used to control testing the first DUT. The machine learning model may be or include one of a KNN (K Nearest Neighbors) model or a neural network.

An example test system includes one or more test instruments for testing devices under test (DUTs), where the DUTs include a first DUT, and a first computing system to use a machine learning model to predict which tests the first DUT will fail, where the machine learning model has been trained based on patterns corresponding to test results from second DUTs that are not among the DUTs to be tested by the one or more test instruments. The example test system also includes a second computing system to control, at least in part, the testing performed by the one or more test instruments. The second computing system is configured to perform operations that include: after the first DUT has failed a first test among the tests, controlling the one or more test instruments to continue testing the first DUT using tests that the first DUT has been predicted to fail by the machine learning model; and outputting test results for the first DUT based on the tests that the first DUT has been predicted to fail. The test system may include one or more of the following features, either alone or in combination.

The first computing system and the second computing system may be implemented on different hardware. The first computing system and the second computing system may be implemented using at least some of the same hardware. The first computing system may be part of the one or more test instruments. The test system may also include a probe configured to implement a test insertion by contacting the first DUT during testing. The machine learning model may be configured make a prediction during the test insertion for the first DUT. The predicting may be performed in 10 milliseconds (ms) or less. The machine learning model may include one of a CNN (K Nearest Neighbors) model or a neural network.

Any two or more of the features described in this specification, including in this summary section, can be combined to form implementations not specifically described herein.

At least part of the example systems, techniques, and processes described in this specification may be configured or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the systems techniques, and processes described in this specification may be configured or controlled using one or more computing systems comprised of one or more processing devices and memory storing instructions that are executable by the one or more processing devices to perform various control operations.

The example systems, techniques, and processes described herein may be configured, for example, through design, construction, arrangement, placement, programming, operation, training, validation, activation, deactivation, and/or control.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Figure 1:
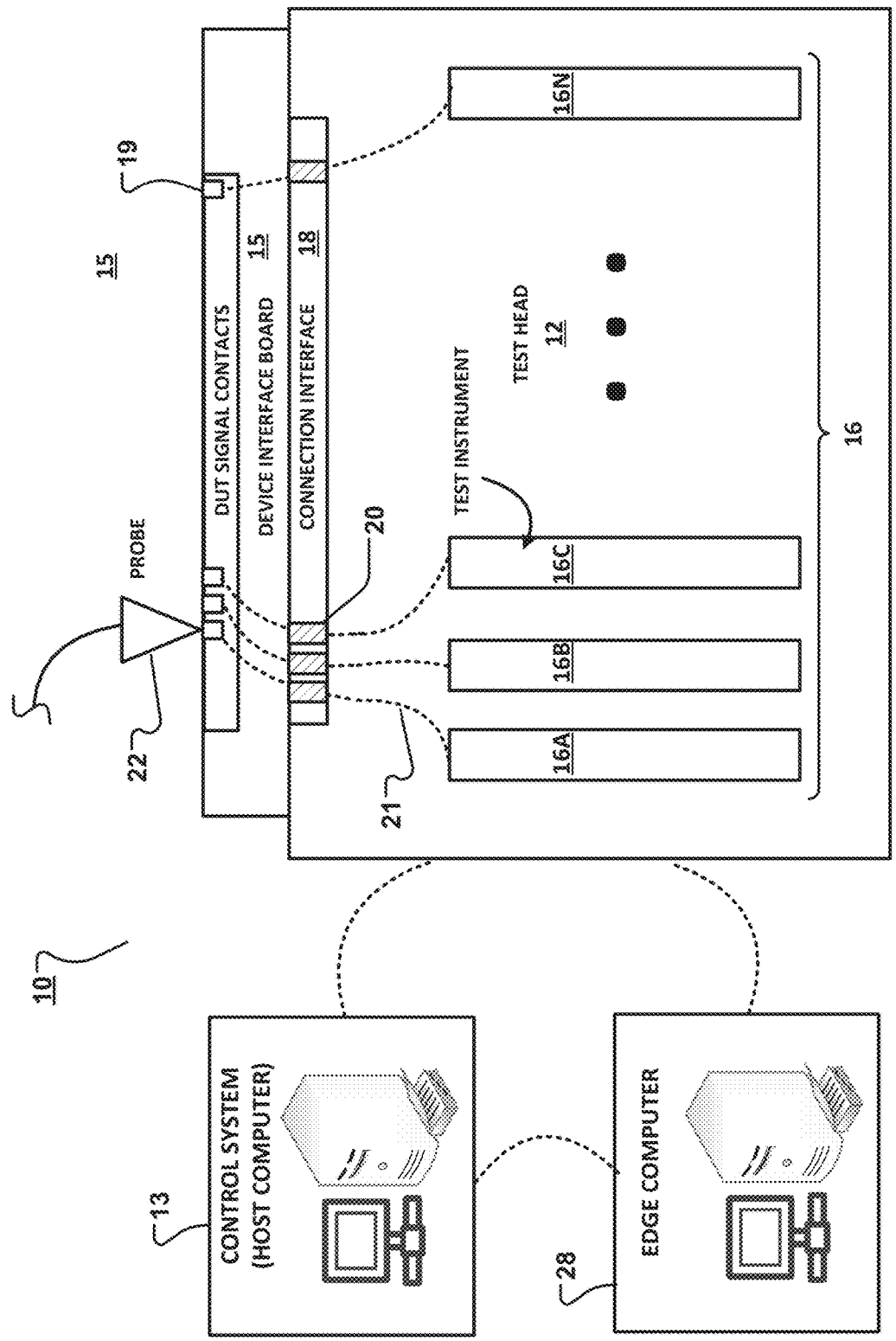
FIG. 1 is block diagram, side view of components of an example test system that may be used to implement processes to identify tests that a device will fail.

An example test system, such as automatic test equipment (ATE), is configured to perform one or more tests on a device under test (DUT). The tests may be performed to determine whether the DUT is working correctly and/or to determine reason(s) why the DUT is not working correctly. Examples tests that may be performed by the ATE on a DUT may include, but are not limited to, radio frequency (RF) tests, microwave tests, millimeter wave (mmWave) tests, direct current (DC) and alternating current (AC) analog voltage (V) and analog current (I) signal tests, digital signal tests, parametric tests, and power tests. The tests may be, or include, system-level tests, component-level tests, or both system and component-level tests.

An example testing protocol includes performing a number of different tests on a DUT to test a number of different DUT features. For example, a test on a DUT may determine whether a signal used by the DUT, such as a clock signal or temperature alarm, is within a predefined voltage range. This may be done by sending a signal to the DUT and identifying the effect of the sent signal on the DUT based on a response from the DUT. If the signal of interest is within its prescribed range, the test is said to have passed. If the signal of interest is not within that range, the test is said to have failed. In some cases a test may include determining whether multiple signals fall within one or more voltage ranges. The test is passed if all, or greater than a predetermined number, of the signals fall within their prescribed voltage ranges. The test is failed if none of the signals fall within their prescribed voltage ranges or fewer than a predetermined number of signals fall within their prescribed voltage ranges.

An example testing protocol performs its tests in a sequence. For example, the testing protocol may include a first test that forces current to the OUT and measures the signal level and parametrics of a response signal, a second test that forces voltage to the DUT and measures the signal level and parametrics of a response signal, a third test that sends an RF signal to the DUT and measures the signal level and parametrics of a response signal, and so forth. The example testing protocol may cease after a DUT has failed one of its tests. In a simplified example, a testing protocol includes ten tests for testing various analog, digital, and RF signals in a DUT. The tests proceed in sequence on the OUT starting with test number 1 and ending with test number 10, In an example, the DUT passes tests numbers 1 and 2, but fails test number 3. The remaining tests—4 to 10—may then not be performed. In another example, the DUT passes tests numbers 1 to 5, but fails test number 6. The remaining tests—7 to 10—may then not be performed. The tests that are not performed may provide insight into any problems with the DUT. For example, the tests that are not performed may provide insight into problems associated with the OUT product line or model.

The example processes described herein (referred to collectively as "the processes") use a machine learning model to predict which tests a DUT will fail. Those tests may then be executed in order to obtain information about the DUT. Prediction by the machine learning model is based on pattern matches associated with tests previously run on other DUTs. For example, for previously-tested DUTs, passed tests may be assigned a binary value, such as "1", and failed tests may be assigned a different binary value, such as "0", or vice versa. A matrix of passed and faded tests—which may be or include a pass/fail pattern comprised of 1's and 0's—is created for each DUT that has been tested. The machine learning model may be trained using these pass/fail patterns. The trained machine learning model may compare pass/fail patterns of previously-tested DUTs to a pass/fail pattern of a target DUT being tested in order to identify which additional tests that the target DUT is likely to fail. The test system (e.g., the ATE) may then continue testing the target DUT using the tests that the target DUT has been predicted to fail. The results of those failing tests may be output for visual display and/or may be analyzed by the ATE and/or EDA (electronic design automation) tool(s) to identify a cause of the failure, to diagnose a problem associated with the target DUT such as a problem inherent its design or construction, and/or to determine whether the target DUT should be retested.

FIG. 1 shows components of example ATE 10 that may be used to implement the processes. In FIG. 1, the dashed lines represent, conceptually, potential signal paths between components of the system. These signal paths may include wired transmission paths such as Ethernet or one or more computer buses and/or direct or indirect wireless transmission paths such as a wireless network or Bluetooth®.

ATE 10 includes a test head 12 and a control system 13. The control system may include a host computer comprised of one or more microprocessors or other appropriate processing devices as described herein. Control system 13 communicates with components included in test head 12 to control testing. For example, control system 13 may download test program sets to test instruments 16A to 16N (collectively, 16) in the test head. In an example, a test program generates a test flow to provide to the DUT. Each test flow is part of a test protocol that includes outputting test signals to the DUT and receiving responses from the DUT. Control system 13 may send, to the test instruments, instructions, test signals and data, and/or other information that are usable by the test instruments to implement the test protocol. As described in more detail below, the test instruments include hardware devices and may include one or more processing devices and other circuitry. Test instruments 16A to 16N may run the test program sets to target DUTs in communication with the test instruments.

In some implementations, the control system is configured—for example, programmed—to generate a graphical user interface (GUI) for display on a computer display device. The GUI is for enabling programming of one or more test system parameters including setting attributes the test signals. For example, the test signals injected into each signal contact may sweep over a range of frequencies. The GUI may allow a user to set this range of frequencies and power levels therefor. Other test parameters may also be set using the GUI. One or more APIs (application programming interface) associated with control system software and/or test program(s) can be used to program one or more test system parameters including, but not limited to, signal parametrics and values of the test signals.

The GUI and/or the API may also identify which tests a DUT has passed, which tests the DUT has failed, and which tests the DUT is predicted to fail. The GUI may also present results of analyses such as those described herein for diagnosing problems with DUTs.

Device interface board (DIB) 15 includes a printed circuit board (PCB) that is connected to test head 12 and that includes mechanical and electrical interfaces to one or more DUTs (not shown) that are being tested or are to be tested by the ATE. Power, including voltage, may be run via one or more conduits in the DIB to DUTs connected to the DIB. In the example of FIG. 1, DIB 15 connects, electrically and mechanically, to test head 12. The DIB includes sites 19, which may include pins, ball grid array (BGA) pads, or other points of electrical and mechanical connection to which the DUTs may connect. Test signals and response signals such as RF signals and other signals pass via test channels over the sites between the DUTs and test instruments. DIB 15 may also include, among other things, connectors, conductive traces and circuitry for routing signals between the test instruments, DUTs connected to sites 19, and other circuitry.

In the example of FIG. 1, ATE 10 includes multiple test instruments 16A to 16N, each of which may be configured, as appropriate, to perform one or more testing and/or other functions. Although only four test instruments are depicted, ATE10 may include any appropriate number of test instruments, including those residing outside of test head 12. Example test instruments may be configured to test a DUT by outputting signals to the DUT such as, but not limited to, AC analog signals, DC analog signals, digital signals, RF signals, microwave signals, mmWave signals, or other types of signals. The test instruments may receive response signals from the DUT. The response signals may be analyzed by the test instruments, by the control system, or by other processing device(s) to determine whether the DUT has passed or failed testing.

An example testing protocol may involve performing hundreds or thousands of tests in order to test the operation of a DUT. The same set of tests may be performed for each DUT or for the same type of DUT or different sets of tests may be performed. As noted, the tests may determine whether signals on the DUT are within an acceptable voltage or current range, whether the DUT is operating within an acceptable temperature range, whether the DUT signal timing is accurate, and so forth. Generally, any feature of a DUT may be tested. For each DUT, the ATE records whether the DUT has passed or failed the tests to which the DUT has been subjected. As explained previously, passed tests may be assigned a binary value, such as "1" and failed tests may be assigned a different binary value, such as "0", or vice versa. A pass/fail pattern comprised of 1's and 0's in this example is created for each DUT that has been tested. The pass/fail pattern for each DUT may be stored, for example, in computer memory on the control system. In some examples, only the failed tests are recorded as part of the pass/fail pattern, although the passed tests are identified implicitly by their absence.

In some examples, ATE 10 includes a connection interface 18 that connects test instrument test channels 21 to DIB 15. Connection interface 18 may include connectors 20 or other devices for routing signals between the test instruments and DIB 15. For example, the connection interface may include one or more circuit boards or other substrates on which such connectors are mounted. Conductors that are included in the test channels may be routed through the connection interface and the DIB.

A probe 22 is connectable to DUTs or signal contacts on DIB 15 to inject signals to the DUT and/or to receive a signal therefrom. In some implementations, the probe is part of ATE 10. In some implementations, the probe may be connected to a separate tester that controls operation of the probe. The probe may be used to apply any type of signal to the DUT, examples of which are described herein. In some examples, the control system may direct the test instrument to control the probe head to inject test signals into a signal contact that have characteristics specified by the control system. The signals are then routed to DUTs on the DIB via conduits on the DIB.

Figure 2:
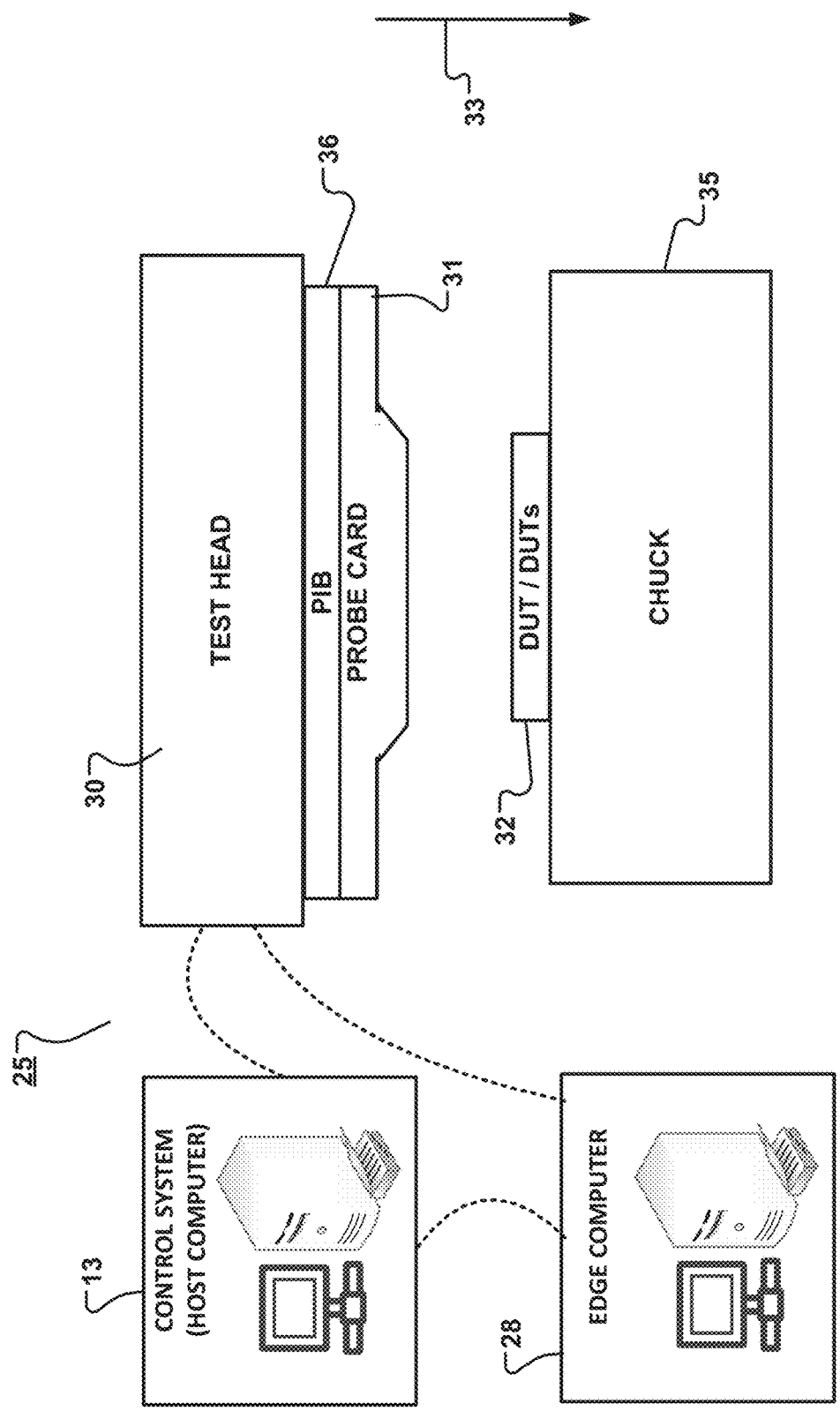
FIG. 2 is block diagram, side view of components of another example test system that may be used to implement processes to identify tests that a device will fail.

FIG. 2 shows another example architecture for an ATE 25. In this architecture, test head 30 may have the same components and implement the same testing functionality as test head 12 of FIG. 1. In ATE 25, the DIB is replaced by a probe interface board (PIB) 36 that connects test instrument channels to a probe card 31. PIB 36 acts as the interface between test head 30 and probe card 31. In this example, probe card 31 is brought into contact with a DUT (or DUTs) 32, such as a wafer or integrated circuits located on a chuck 35, through movement in the direction of arrow 33. Probe card 31 includes electrical contacts that connect to corresponding electrical contacts on DUT 32. Test and response signals are sent to/from the test head 30, through PIB 36, and through the electrical connection between the electrical contacts on probe card 31 and the electrical contacts on DUT 32. As described with respect to FIG. 1, the test instruments output test signals and receive response signals from the DUT. Analyses are performed by the test instrument or one or more computing devices to determine whether the DUT has passed or failed various tests that are performed. ATE 25 also includes control system 13 and edge computer 28, which may both be the same as in ATE 10 of FIG. 1.

Contact between a probe or probe card and the DUT is referred to as a test insertion. All or part of the processes described herein may be performed during a test insertion or all or part of the processes may be performed absent a test insertion.

ATE 10 and ATE 25 may each includes an edge computer 28, which may have the same structure and function in each system. Edge computer 28 may be separate hardware than control system 13 or it may be the same hardware. Edge computer 28 may include one or more processing devices and computer memory storing instructions that are executable by the one or more processing devices to implement all or part of the processes described herein. In some cases, the operations performed by the edge computer may be performed by the control system, by a test instrument having edge computer functionality built-in, by a computing system (not shown) that is insertable into a rack containing the test instruments, and/or using cloud computing. In an example, cloud computing includes using a network of one or more remote computers hosted on the Internet to store, to manage, and/or to process data Using a separate edge computer or other processing device(s) to implement the processes may enable test control and/or predictions to be performed by the control system with reduced latency. That is, the processes for predicting failing tests may be segregated from test control operations performed by the control system in order to reduce the effects of prediction on test performance and latency and to reduce the time it takes to perform the predictions. In an example, the predictions are performed on the order of tens of milliseconds (ms) or less, e.g., in 20 milliseconds (ms) or less, in 10 ms or less, or in 5 ms or less. In general, prediction time is proportional to the complexity of the machine learning model and a size of the data set.

Figure 3:
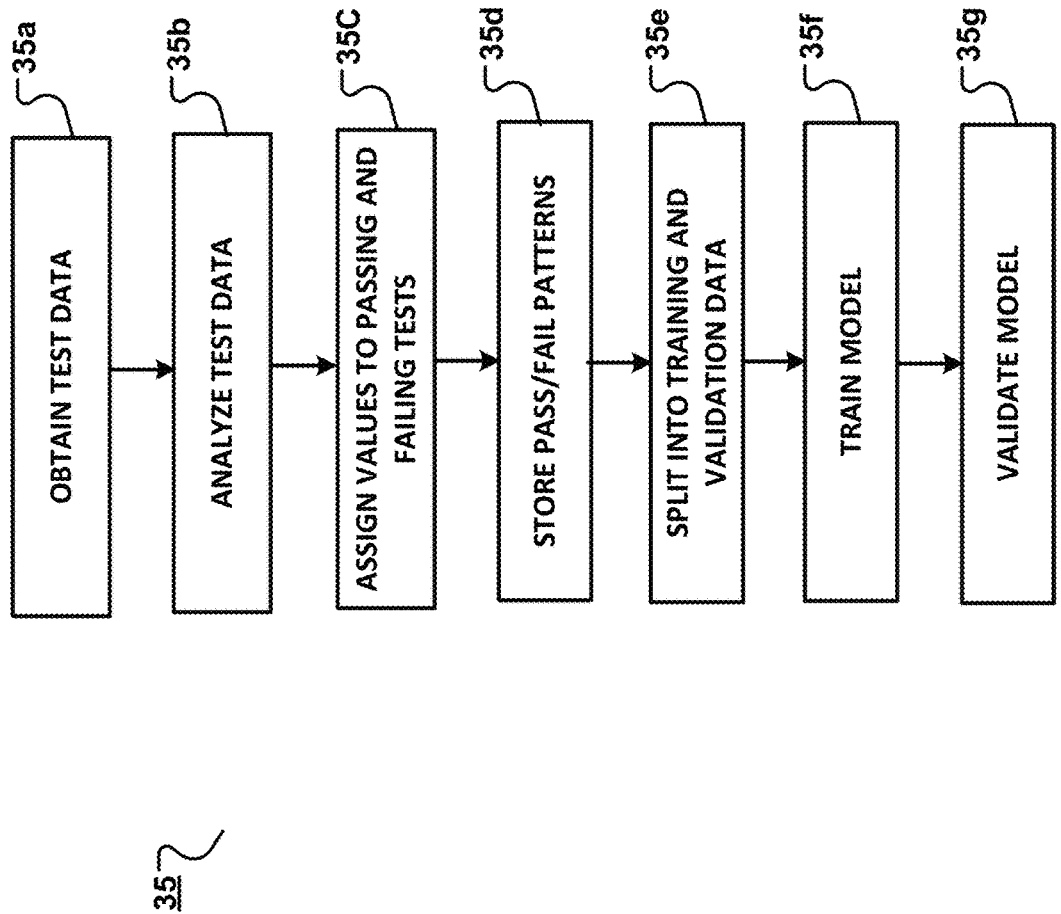
FIG. 3 is a flowchart showing operations included in an example process for training an example machine learning model to predict tests that a device will fail.

FIG. 3 shows operations included in an example process 35 for training a machine learning model to predict tests that a device will fail. The machine learning model and process 35 may be implemented solely on the edge computer, solely on the control system, on a combination of the edge computer and the control system, on other hardware such as a computing system in a test head rack, or on any combination thereof. In an example, model training may be implemented using cloud computing.

Figure 4:
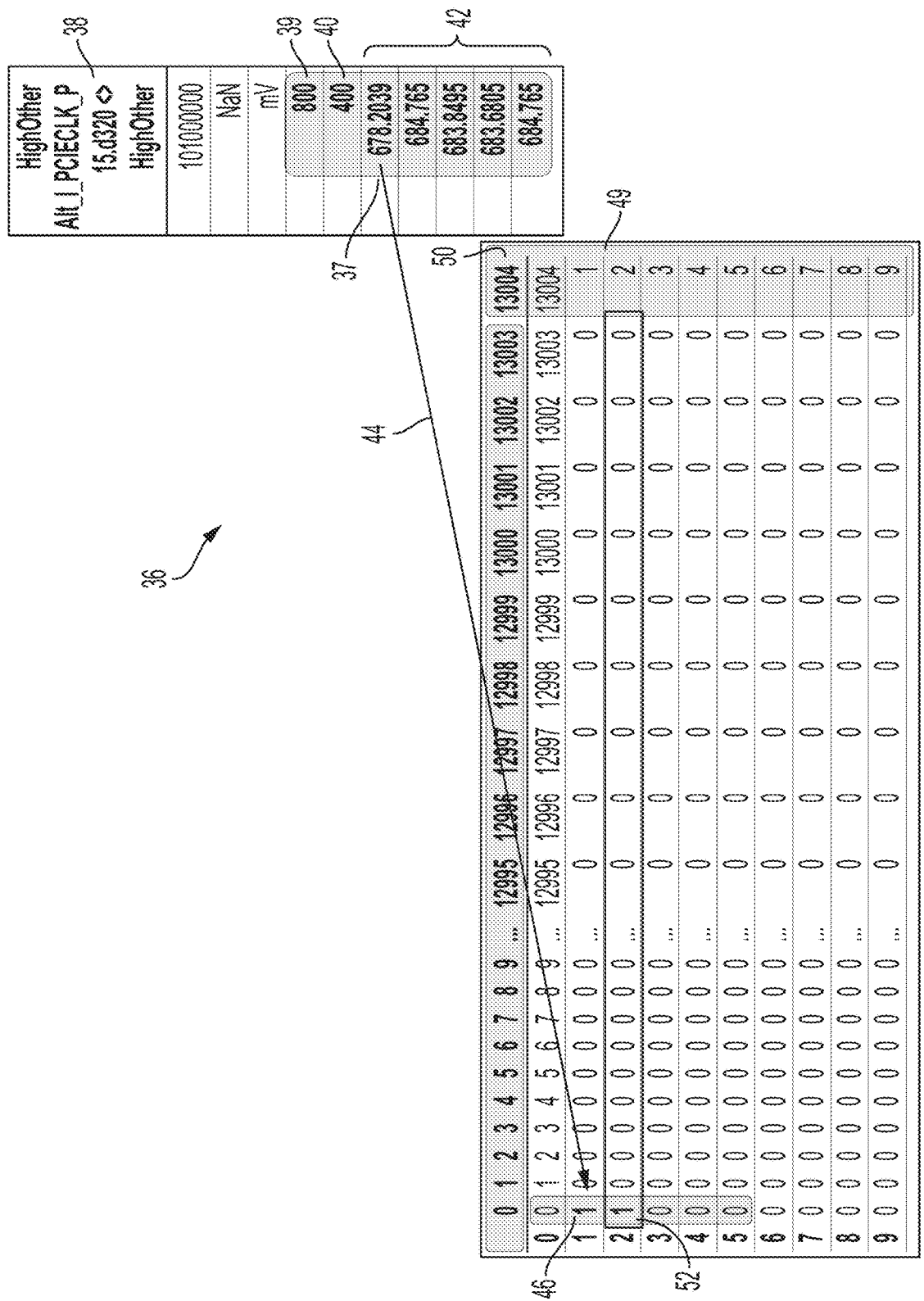
FIG. 4 is a diagram showing example data used by the machine learning model to predict tests that a device will fail.

Process 35 includes obtaining (35a) test data from ATE. The test data represents results of tests performed by one or more test instruments on an initial set of DUTs. The tests performed on the initial set of DUTs may be any of the types of test described herein. For example, FIG. 4 shows portion 36 of a data set for a DUT tested by ATE. This portion of the data set includes a set of values 37 relating to a signal 38. The values includes an acceptable range containing high 39 and low 40 voltage values in millivolts (mV) for signal 38 and various measurements 42 of signal 38 obtained from the DUT by the ATE. If each of these measurements is within the acceptable range, then the DUT is deemed to have passed a test. If one or more of these measurements is outside the acceptable range, then the DUT is deemed to have failed the test. Note that although this particular test involves multiple measurements 42 of signal 38; that need not be the case. That is, a single measurement may be a single test.

The test data obtained from DUTs in the initial set is analyzed (35b) to determine which tests each DUT passed and which tests each DUT failed. The analyses may include comparing the measurements of a signal to an acceptable range, comparing voltage or current levels to thresholds, identifying correct signal timing, or any other appropriate analysis. Tests that have been passed or failed are formatted 44 (FIG. 4), e.g., assigned (35c) values. In this example, the values are 0 for fail and 1 for pass. However, any appropriate value or other indicator may be assigned to indicate a pass or a fail. Each formatted test result such as 46 is associated with a DUT (or "part") and is assigned a label that is unique to the DUT. For example, DUTs 49 may be labeled sequentially from 1 to N (N>1), where N is the last DUT tested. Likewise tests 50 may be labeled from 0 to M (M>1), where M is the last test to be performed. The resulting pass/fail patterns, such as example pass/fail pattern 52, for all DUTs 49 in the initial set are stored (35d) in computer memory, as described above. In some implementations, the pass/fail patterns are specific to a type of DUT such as a microprocessor or are specific to a particular DUT manufacturer. Information about the type of DUT may be stored in computer memory with the corresponding pass/fail patterns.

The pass/fail patterns are split (35e) into training data and validation data. The split may, or may not, be even—for example, there may be the same number of pass/fail patterns in the training data as in the validation data; there may be fewer pass/fail patterns in the validation data than in the training data, or there may be fewer pass/fail patterns in the training data than in the validation data. In some examples, the split of pass/fail patterns into training data and validation data is random.

Process 35 uses the training data to train (35f) a machine learning model to predict which tests a target DUT (that is, a DUT not part of the initial set) will fail based on a pass/fail pattern match to one of the stored pass/fail patterns for DUTs in the initial set. Any appropriate machine learning model may be used, examples of which include, but are not limited to, the KNN (K Nearest Neighbors) model or a neural network. The machine learning model uses the pass/fail pattern for the target DUT to identify a closest pass/fail pattern among the DUTs in the initial set. The match between the pass/fail pattern for the target DUT and a pass/fail pattern for a OUT in the initial set need not be exact, Rather, the machine learning model may be trained to identify the pass/fail pattern from the initial set of DUTs that is closed to the pass/fail pattern of the target DUT. Closeness may be defined in terms of numbers of individual matches, with a greater number of matches indicating greater closeness. In some implementations, the machine learning model may be trained to identify N (N≥1) DUTs from the initial set that has/have the closest pass/fail pattern(s) to the target DUT.

Process 35 uses the validation data to validate (35g) the trained machine learning model. Additional training and validation data may be used with the machine learning model in order to affect—e.g., to improve—its predictive accuracy. The machine learning model may be deployed on the edge computer, the control system, or any other appropriate hardware in communication with the ATE.

Figure 5:
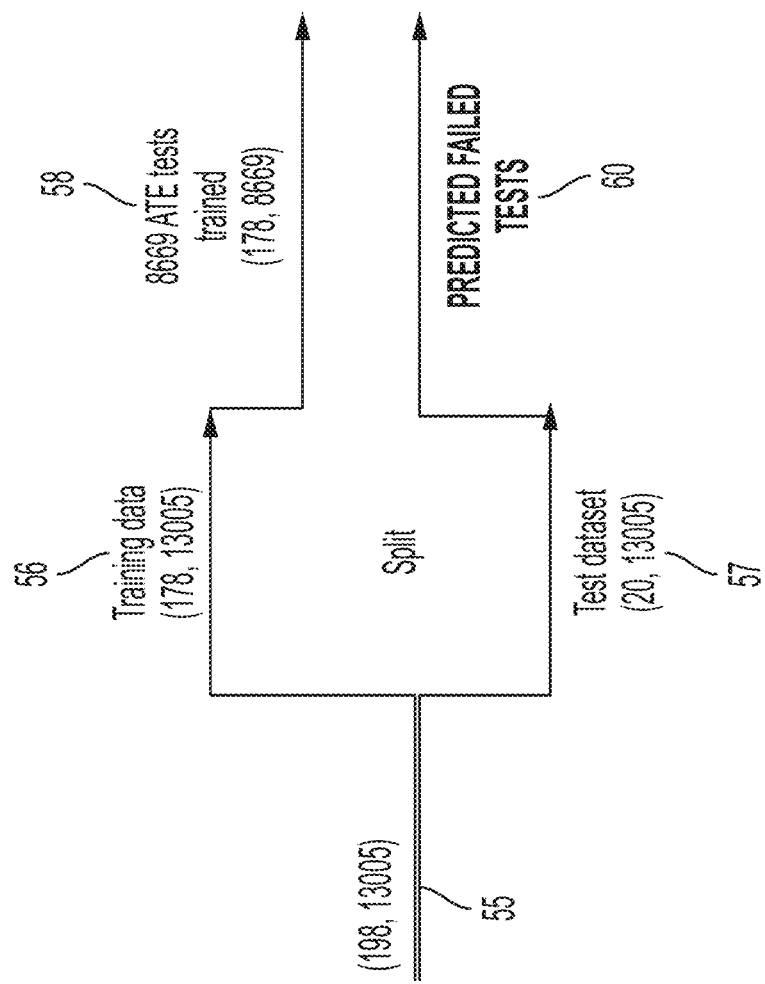
FIG. 5 is a diagram showing example training and validation data for the machine learning model.

In the example of FIG. 5, the machine learning model is trained using data 55 for 198 DUTs, where each DUT has the same 13,005 different tests performed on it (hence the label (198, 13,005 in FIG. 5). The 198 DUTs may all be the same type of DUT (e.g., different models of WiFi modules) or different types of DUTs (e.g., WiFi modules, microprocessors, and network processors of various models). The data set is spit into training data 56 and validation ("test") data 57. The training data trains the machine learning model using pass/fail patterns for 8669 tests performed on 178 of the 198 DUTs 58. The machine learning model is validated using pass/fail patterns for the same 8669 tests performed on 20 of the 198 DUTs. In this example, the machine learning model, once trained, predicts tests 60 that a DUT will fail after the 8669$^{th}$ test, as described below. The numbers of tests, DUTs, training data, and validation data in FIG. 5 are examples only. Any appropriate numbers of tests, DUTs, training data, and validation data may be used to implement the processes described herein.

Figure 6:
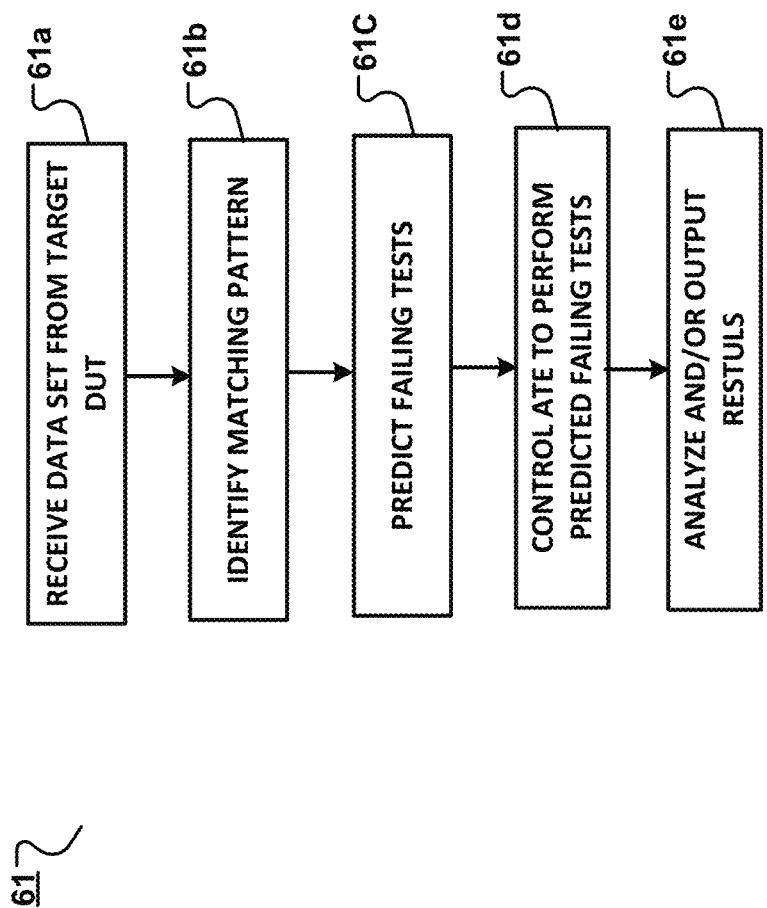
FIG. 6 is a flowchart showing operations included in an example process for using the machine learning model to predict tests that a device will fail.

FIG. 6 shows operations included in an example process 61 that uses the machine learning model to predict tests that a target DUT will fail. After the machine learning model has been trained, process 61 receives (61a) a data set from a target DUT that is not part of the initial set but that has been subject to at least some of the same tests as the DUTs in the initial set. The data set includes a pass/fail pattern for the target DUT. The pass/fail pattern for the target DUT may have at least a predefined size. In this regard, in the above example, the machine learning model has been trained for 8669 tests; however, in other examples, the machine learning model may be trained for a different number of tests such as, but not limited to, 10 tests, 50 tests, 100 tests 200 tests, 500 tests, 1000 test, 2000 tests, 5000 tests, 10,000 tests, or any number smaller, larger, or in between these values. In an example, the number of tests for which the machine learning model is trained corresponds the minimum size of the pass/fail pattern of the target DUT. Taking the above numbers as an example, the target DUT may have been subjected to 8669 of the 13,005 tests. The pass/fail pattern for those 8669 tests may be entered into the machine learning model to predict which of the remaining tests that the target DUT will fail, That is, the machine learning model to predict may predict which of test numbers 8670 to 13,004 the DUT will fail, where 13,004 is used here because the numbering for tests starts at 0 not 1 in this example. As described below, this prediction is determined by matching the pass/fail pattern of the target DUT to one or more of the stored pass/fail patterns. In some cases, the machine learning model also receives information identifying a type or an identity of the target DUT and takes this information into account when making the prediction. For example, in some cases, pass/fail patterns of unrelated DUTs may be discounted or not used during prediction.

In an example, the machine learning model identifies (61b) that the pass/fail pattern of the target DUT matches a stored pass/fail pattern. As noted above, matching does not require an exact match between patterns. For example, the DUT in the initial set having a pass/fail pattern that is closest to the pass/fail pattern of the target DUT is identified. Tests that the DUT in the initial set has failed are identified based on its pass/fail pattern. The machine learning model then predicts (61c) that, because the DUT in the initial set failed these tests, the target DUT will also fail the same tests. In some implementations, multiple DUTs having pass/fail patterns closest to the pass/fail pattern of the target DUT are identified. For example, the machine learning model may pick a predetermined number, e.g., two, five, etc., of pass/fail patterns that are closest to the pass/fail pattern of the target DUT. Tests that the DUTs represented by those pass/fail patterns have failed are identified based on their pass/fail patterns. The machine learning model may then predict that the target OUT will fail the same tests.

During a test insertion for the target DUT, the machine learning model may make a prediction about, and identify, which tests the target DUT will fail. Alternatively, outside of a test insertion for the target DUT, the machine learning model may make a prediction about, and identify, which tests the target DUT will fail.

Process 35 includes controlling (61*d*) testing of the target DUT based on the prediction made by the machine learning model. For example, the ATE may be controlled to continue testing the target DUT using tests that the machine learning model has predicted the target DUT will fail. These tests are performed even after the target DUT has failed prior tests in a sequence. In the preceding example, the machine learning model may predict that the target DUT will fail tests numbers 8670, 8680, 8690, and 9000. The control system will continue testing even after test 8670 failed to ensure that tests 8680, 8690, and 9000 are performed and test results based on those (and potentially other) tests are obtained.

The test results may be output and/or analyzed (61*e*) by the control system or another computing system to diagnose a problem with the target DUT. Analysis of the test results may be performed absent a test insertion for the target DUT or during a test insertion for the target DUT. The analyses may include, for example, identifying that a particular component of the DUT consistently fails different types of tests. The analysis may therefore indicate a potential problem with the component. The analyses may include, for example, identifying that a particular component of the DUT consistently fails the same types of tests at increased temperatures. The analysis may therefore indicate that a less temperature-sensitive component should be used.

The analyses may be performed in order to determine whether a DUT should be retested. For example, if the DUT has been predicted to fail a number of tests that other DUTs of the same model have passed, the DUT may be an defective. Additional testing on the DUT may be performed in order to determine if the DUT is defective.

The example systems described herein may include hardware or a combination of hardware and software. For example, a system like the ones described herein may include various controllers and/or processing devices located at various points in the system to control operation of the automated elements. A central computer may coordinate operation among the various controllers or processing devices. The central computer, controllers, and processing devices may execute various software routines to effect control and coordination of the various automated elements.

The processes described herein may be performed by systems or any other appropriate computing device. The processes can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" as used herein may include a direct physical connection or an indirect connection that includes intervening components but that nevertheless allows electrical signals to flow between connected components. Any "connection" involving electrical circuitry mentioned herein through which electrical signals flow, unless stated otherwise, is an electrical connection and not necessarily a direct physical connection regardless of whether the word "electrical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. One or more non-transitory machine-readable media storing instructions that are executable by one or more processing devices to perform operations comprising:
   obtaining data representing results of tests executed by one or more test instruments on an initial set of devices under test (DUTs) in a test system; and
   using the data to train a machine learning model, the machine learning model for predicting which of the tests will produce failing results for a different set of DUTs, where DUTs in the different set have one or more features in common with DUTs in the initial set, and where the machine learning model identifies patterns from results of the initial set of DUTs that are closest to patterns from results of the different set of DUTs to predict which of the tests will produce failing results for the different set of DUTs, and where the patterns from results of the initial set of DUTs and the patterns from results of the different set of DUTs are indicative of passing or failing of the tests executed by the one or more test instruments.

2. The one or more non-transitory machine-readable media of claim 1, wherein the machine learning model is configured to perform predicting for a first DUT in the different set by matching, at least partly, a first pattern associated with the first DUT with a second pattern associated with a second DUT in the initial set.

3. The one or more non-transitory machine-readable media of claim 2, wherein the first pattern corresponds to first tests that the first DUT has passed or failed, and the second pattern corresponds to the first tests that the second DUT has passed or failed.

4. The one or more non-transitory machine-readable media of claim 3, wherein predicting which of the tests will produce a failing result for the first DUT comprises identifying second tests that the second DUT has failed.

5. The one or more non-transitory machine-readable media of claim 4, wherein the second tests are predicted ones of the tests that the first DUT will fail.

6. The one or more non-transitory machine-readable media of claim 2, wherein the first pattern is a binary pattern representing passes or fails with ones or zeros, and the second pattern is a binary pattern representing passes or fails with ones or zeros.

7. One or more non-transitory machine-readable media storing instructions that are executable by one or more processing devices to perform operations comprising:
   using a machine learning model to predict which tests a first device under test (DUT) will fail, where prediction by the machine learning model is based on pattern matches associated with tests previously run on second DUTs by identifying patterns from the second DUTs that are closest to patterns from the first DUT to predict which of the tests the first DUT will fail, where the patterns from the first DUT and the patterns from the second DUTs are indicative of passing or failing of the tests executed by one or more test instruments;
   after the first DUT has failed a first test among the tests, controlling a test system to continue testing the first DUT using tests that the first DUT has been predicted to fail by the machine learning model; and
   outputting test results for the first DUT based on the tests that the first DUT has been predicted to fail.

8. The one or more non-transitory machine-readable media of claim 7, wherein the operations comprise:
   analyzing the test results to identify a cause of test failure by the first DUT.

9. The one or more non-transitory machine-readable media of claim 7, wherein analyzing the test results is performed absent a test insertion for the first DUT, where, during the test insertion, a probe contacts the first DUT while the first DUT is operating.

10. The one or more non-transitory machine-readable media of claim 7, wherein the machine learning model is configured to make a prediction during a test insertion for the first DUT, where, during the test insertion, a probe contacts the first DUT while the first DUT is operating.

11. The one or more non-transitory machine-readable media of claim 7, wherein the operations comprise:
    analyzing the test results to determine whether to retest the first DUT.

12. The one or more non-transitory machine-readable media of claim 7, wherein predicting is performed in 10 milliseconds (ms) or less.

13. The one or more non-transitory machine-readable media of claim 7, wherein the machine learning model is executed on a separate computer system than a computer system used to control testing the first DUT.

14. The one or more non-transitory machine-readable media of claim 7, wherein the machine learning model comprises one of a KNN (K Nearest Neighbors) model or a neural network.

15. A test system comprising:
    one or more test instruments for testing devices under test (DUTs), the DUTs including a first DUT;
    a first computer system comprising one or more processing devices to use a machine learning model to predict which tests the first DUT will fail, the machine learning model having been trained based on patterns corresponding to test results from second DUTs that are not among the DUTs to be tested by the one or more test instruments, where the machine learning model is configured to identify patterns from the second DUTs that are closest to patterns from the first DUT to predict which tests the first DUT will fail, and where the patterns from the first DUT and the patterns from the second DUTs are indicative of passing or failing of the tests executed by the one or more test instruments; and
    a second computer system comprising one or more processing devices to control, at least in part, the testing performed by the one or more test instruments, the second computer system for performing operations comprising:
    after the first DUT has failed a first test among the tests, controlling the one or more test instruments to continue testing the first DUT using tests that the first DUT has been predicted to fail by the machine learning model; and outputting test results for the first DUT based on the tests that the first DUT has been predicted to fail.

16. The system of claim 15, wherein the first computer system and the second computer system are implemented on different hardware.

17. The system of claim 15, wherein the first computer system and the second computer system are implemented using at least similar hardware.

18. The system of claim 15, wherein the first computer system is part of the one or more test instruments.

19. The system of claim 15, further comprising:
a probe configured to implement a test insertion by contacting the first DUT during testing;
wherein the machine learning model is configured make a prediction during the test insertion for the first DUT.

20. The system of claim 15, wherein a prediction time is proportional to a complexity of the machine learning model and a data set size.

21. The system of claim 15, wherein the machine learning model comprises one of a KNN (K Nearest Neighbors) model or a neural network.

22. A method comprising:
obtaining data representing results of tests executed by one or more test instruments on an initial set of devices under test (DUTs) in a test system; and
using the data to train a machine learning model, the machine learning model for predicting which of the tests will produce failing results for a different set of DUTs, where DUTs in the different set have one or more features in common with DUTs in the initial set, where the machine learning model identifies patterns from the initial set of DUTs that are closest to patterns from the different set of DUTs to predict which of the tests will produce failing results for the different set of DUTs, and where the patterns from the initial set of DUTs and the patterns from the different set of DUTs are indicative of passing or failing of the tests executed by the one or more test instruments.

23. A method comprising:
using a machine learning model to predict which tests a first device under test (DUT) will fail, where prediction by the machine learning model is based on pattern matches associated with tests previously run on second DUTs by identifying patterns from the second DUTs that are closest to the patterns from the first DUT to predict which of the tests the first DUT will fail, where the patterns from the first DUT and the patterns from the second DUTs are indicative of passing or failing of the tests executed by one or more test instruments;
after the first DUT has failed a first test among the tests, controlling a test system to continue testing the first DUT using tests that the first DUT has been predicted to fail by the machine learning model; and
outputting test results for the first DUT based on the tests that the first DUT has been predicted to fail.

* * * * *